Patented Oct. 2, 1934

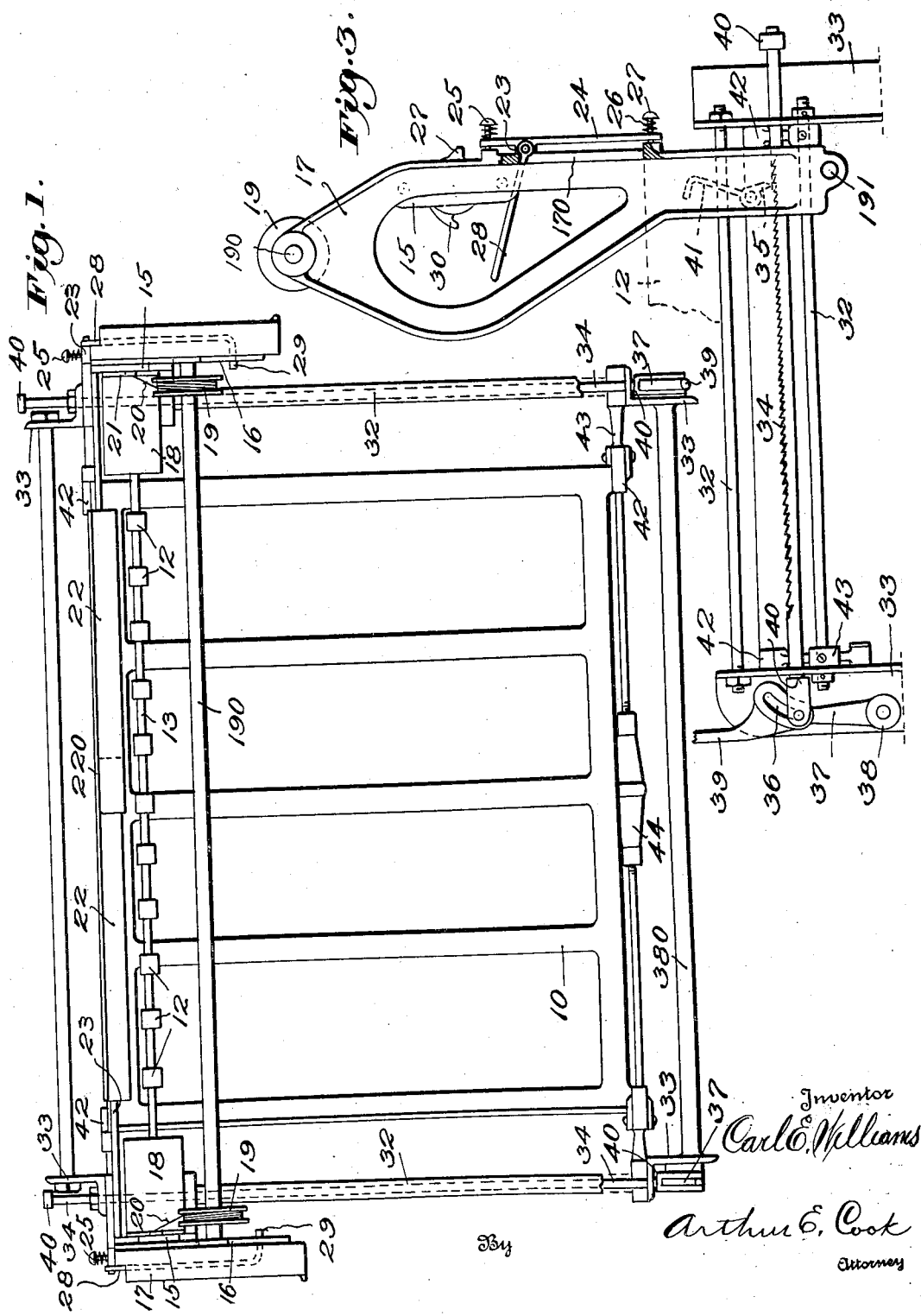

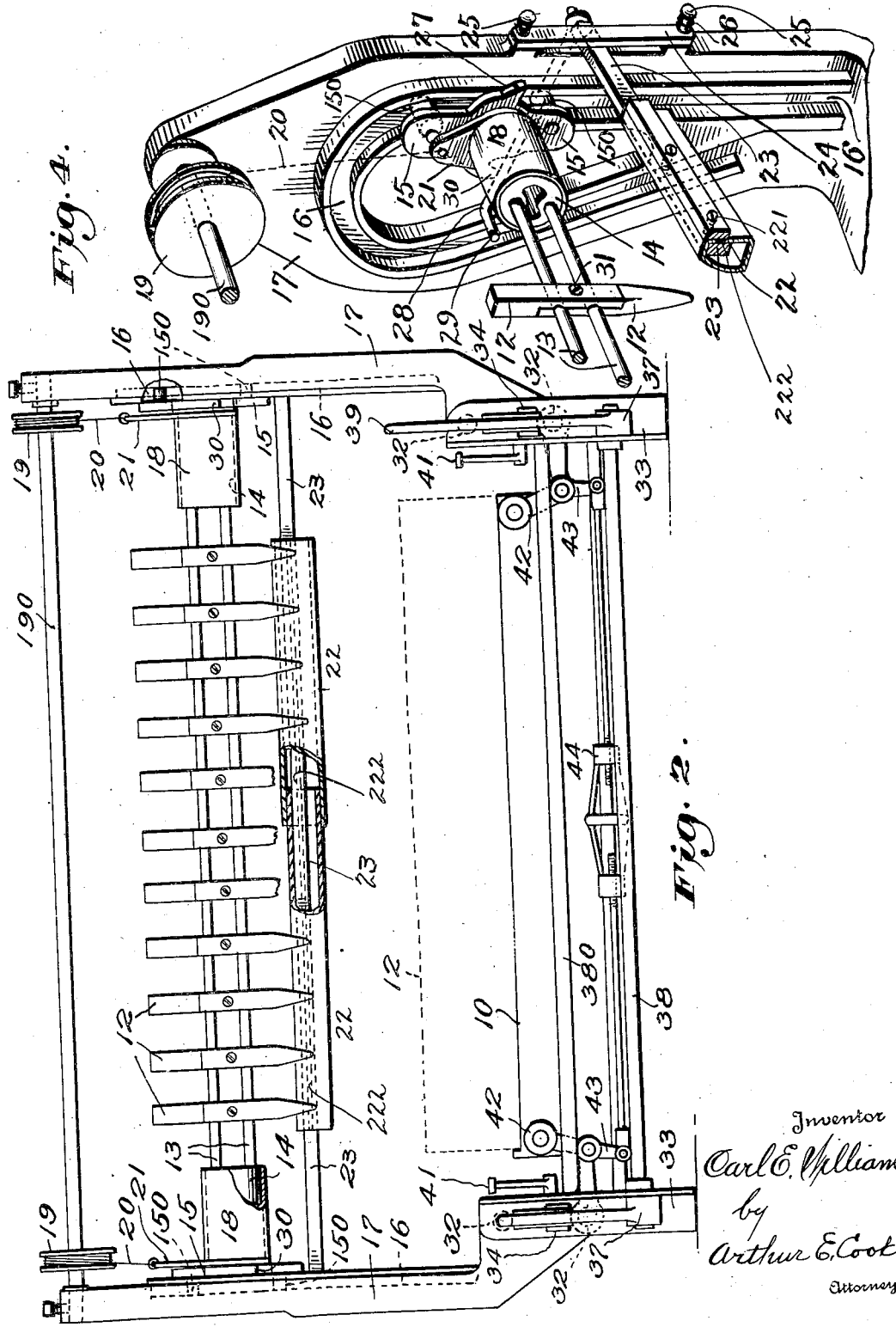

1,975,491

UNITED STATES PATENT OFFICE 1,975,491

PLANTING MACHINE

Carl E. Williams, West Middlesex, Pa.

Application April 20, 1932, Serial No. 606,447

18 Claims. (Cl. 55—67)

My invention relates to planting devices and in the embodiment which I show in the drawings and describe in detail hereinafter, my invention is a device or instrumentality for the setting of young plants, as in greenhouse or nursery boxes, flats or containers. Having reference to this particular embodiment of my invention, I have in view the provision of a machine by which can be done the work that in accordance with immemorial practice has been done by and laboriously, slowly, and inefficiently. An object of my invention is to enable the work of setting plants to be done more rapidly and, therefore, more inexpensively than is possible by hand and which will result in the utilization of the earth or soil to the maximum and in better results as far as growth or development of the plant is concerned. An important object of my invention is to provide such a machine that may be manually operated and require the minimum of effort or labor on the part of the workman. Other objects and advantages of my invention will appear hereinafter.

My invention consists in whatever is described by or is included within the terms or scope of the appended claims.

In the drawings:

Fig. 1 is a top plan view of a machine embodying my invention;

Fig. 2 is a front elevation thereof;

Fig. 3 is a side elevation;

Fig. 4 is a detail view in perspective, of a portion of one of the side frames with associated parts.

The embodiment of my invention shown in the drawings is a machine for setting plants in rows in a greenhouse box or flat and it comprises a horizontal base or platform 10, in the form of a rectangular open-work or skeleton plate of an area to accommodate the largest box or flat in which plants are to be set as well, of course, as smaller ones. The maximum size in ordinary use is twenty-five inches by twenty-five inches with a depth of five inches, and smaller ones are of different proportions and with the minimum depth of two inches. Such a box or flat 11, is shown in dotted lines in Figs. 2 and 3, resting on the platform.

Mounted for movement from a position well above the soil or earth in the box or flat to the latter is a row or series of slender bars or punches 12, tapered or pointed at one end and blunt at the upper end so that by a downward movement with the pointed ends, lowermost, the latter may be thrust into the soil in the box and then withdrawn therefrom to provide the individual holes for individual plants to be inserted and then afterwards and in an inverted position, may have their blunt ends brought into contact with the soil adjacent each plant to tamp or close the soil with sufficient tightness upon the set plant. It will be seen that a row or series of holes will be formed in a single operation, and they will be spaced apart with that regularity which comes from regular spacing or setting of the punches and that simultaneously all the plants of a row (which, of course, are set by hand) will be properly tamped or secured in the soil.

Obviously both great speed and accuracy of spacing so that each plant will have the same amount of soil and room for its growth are achieved.

The punches are individually secured to a carrier that includes two parallel separated horizontal rods 13, which at opposite ends are fixed to two similar short cylindrical blocks 14, at one end of the latter, the other or outer end of each of said blocks being fixed to a slide 15, that slidably lies against and is guided by a guideway 16, at the inner side of a vertical side frame 17, at the side of the machine. The guideway has a straight, vertical portion which directs the punches in their vertical movement with their tapered ends downward to carry them to the soil in the box to make the holes and upward to a point sufficiently high to clear plants that are set in the box and from the top of such straight portion, it curves in substantially a semi-circle and then extends downward at an incline to or nearly to the lower end of the straight vertical portion, so that the punches after completing their ascent to the highest point will make a reverse turn to place their blunt ends lowermost and then by downward movement in their reversed position, their blunt ends will be directed clear of the plants to the soil at the side of the set plants to tamp them. The slides have each at their outer sides two spaced-apart rollers 150, which track along the guideway and thereby the easy and proper travel of the punches assured. (Fig. 4, the slide is spaced from the guideway to expose the rollers.)

The two punch-carrier cylindrical blocks 14, are utilized as handles to be grasped by the hands of the operator to impart the described movements to the punches. Each, however, is surrounded by a cylindrical hand-engaging tube 18, which is non-rotary within which the cylindrical blocks revolve and as the handle tubes 18, are non-rotary, there is no friction on the grasping hand, and thus no retardation of the partial rotation of the punch carrier nor discomfort to the operator's hands, can occur from friction. The return upward movement of the punch carrier is assured or contributed to by spring means which as shown, include a spring or tension pulley 19, mounted to turn freely on the upper side frame tie-rod 190, from which a cord or chain 20, passes, that is attached to a radial arm 21, in the form of a thin plate fixed to each non-rotary handle tube 18. The spring or tension pulleys normally hold the punch carriers in the raised, or uppermost position. Besides the tie-rod 190, between the side frames 17, at the top, there is another tie-rod 191 at the bottom.

To facilitate and thus hasten the manual setting of the plants in the holes in the soil, I provide a plant support in the form of a horizontal cross-bar 22, that extends between the side frames and lies on the soil in front of the row of holes when the punches have formed them and the punches are withdrawn therefrom. Said cross-bar 22, on the side next the holes is arched or curved so as to accommodate without injury the upwardly enlarging form of the plants. Said bar is mounted for vertical movement so that it is in place for functioning as a plant support immediately following the production of the holes in the soil and may thereafter be lifted sufficiently high to clear the plants for horizontal shifting of the punches to place them in position for the formation of another row of holes in the soil. The vertical movements of the plant supporting bar 22, are preferably effected automatically in synchronism with the vertical movements of the punches. To enable this to be done, the plant supporting bar 22, at each end has a flat bar extension 23, that moves in a vertical guideway formed by the adjacent edge of the side frame and a vertical bar 24, secured at top and bottom to said side frame as by a pair of horizontal pins 25. Each pin 25, has a coil spring 26, between its head and the outer side of the bar 24, so that it yieldingly presses against the bar end 23, with enough friction to cause the bar 22, to remain in whatever position at top and bottom of its movement, it may occupy. Downward movement of the plant supporting bar 22 from its raised position, is effected by the contact with the upper side thereof of a lug 27, on one side of the slide 15. Upward movement from its lowest plant supporting position is affected through a rod 28, attached to each end of the bar 23, and which has a laterally bent finger 29, in the path of and adapted to be engaged by a hook-shaped projection 30, on the side of the guide bar 13, opposite the lug 27, when the punch carrier having made a half turn in the curved upper portion of its path of movement and on its return from the tamping action of the punches, results in engagement of said curved finger 30, with the finger 29. The end of the rod 28, is pivotally connected to the bar end 23, so that it can swing vertically under the pull of the hook 30. Vertical swing of the rod 28, is limited as by upper and lower ends of a slot 170 provided in a rib on the outer side of the side frame, 17. (See Fig. 3.)

The plant supporting bar 22, is longitudinally adjustable as by being made of hollow telescopic sections. Such longitudinal adjustment is desirable for use with plant boxes of different widths, to enable the lowering of the supporting bar 22, between the opposite sides of the plant box and into contact with the soil, so that the plant supporting bar will rest on the soil at the time of setting the plants in the thus formed holes. And this will assure leveling or pressing down the top surface of any displaced soil adjacent the holes. The level of the soil in the box may not always be flush with the box top, but below it, and this renders it desirable to provide for the descent of the plant supporting bar between the side walls of the box. The two sections are clamped at the desired adjustment by a bar 220, and screws 221, that pass through a longitudinal slot 222, into the bar 23, inside the hollow sections. (See Figs. 2 and 4.)

For the ready adjustment of the spacing between the punches and the application of individual punches when necessary without disturbing others, each punch as shown in Fig. 4, is made of two separable sections, each section having on its inner side a half round hole to engage each of the carrier rods, 13 and being held detachably thereon by a set screw 31.

The side frames, 17, and all the parts carried thereby are horizontally shiftable so that after one row of plants has been set, the parts may be moved to proper position above the plant box or flat for setting the next row of plants. To enable that to be done, the lower ends of the housings slidably engage parallel horizontally spaced-apart rods, 32, supported at opposite ends by short angle-iron legs 33, by which also the box or flat supporting platform, 10, is indirectly supported, as hereafter explained. For the convenient and accurate shifting of the side frames, I provide for each a horizontal rack bar 34, and a gravity dog 35, for each side frame which co-operates with the teeth of the rack bar so that by reciprocating the rack bars, the side frames may be moved horizontally step by step. For reciprocating the rack bars, each at one end is engaged by a cam slot 36, in a lever arm 37, fixed to a rock shaft 38, and one of said crank arms has a handle 39, for rocking. The reciprocation of the rack bars is limited by suitable stop shoulders 40, on each end of the rack bar outside the legs 33, and which contact with the latter. The rock shaft 38, also serves as a brace between opposite legs 33, and there is a second brace 380, spaced above shaft 38.

The feed dogs 35, are, of course, disengaged from the rack bars when return movement of the side frames with the parts mounted thereon is necessary. For that purpose, each dog may have attached to it a crank handle 41, in position readily to be grasped by the workman in the act of pushing the side frames.

It is desirable because of different soil depths in different plant boxes to provide for vertical adjustment to determine the depth of the holes formed by the punches. Since in the case of the machine shown in the drawings, the punches always descend to the same point, I provide for that adjustment by raising or lowering the box supporting platform. To that end, I pivot such platform near each corner to the upper end of a link 42, pivotally connected with the angle of a bell-crank lever 43, of the supporting legs, 32, and the system of levers thus provided may, by a turnbuckle 44, connected with an opposite pair of levers 43, be rocked to raise and lower the platform and hold it as adjusted. The levers on the same side are fixed to the lower tie-rod which serves as a rock shaft, turning in bearings in the legs 33.

The embodiment of my invention shown in the drawings is regarded by me as a most satisfactory one and one which will advantageously achieve the objects of my invention. It is to be understood, however, that my invention may be embodied in machines of different construction and which will not include all of the desirable features of the machine shown in the drawings. To simplify and, therefore, cheapen construction and render it possible to supply machines to the market at less cost, some of the features of construction which assure or contribute to automatic action, may be dispensed with. It is, therefore, to be understood that I do not limit my protection only to a machine such as that shown in the drawings and described in detail herein, but the scope of my invention and the protection I desire, depend upon the following claims.

What I claim is:

1. A planting device comprising a support, soil penetrating means, soil tamping means and a movable connection between both such means and said support permitting movement thereof towards and from the soil for successive action thereon, said support remaining in the same position for such successive action.

2. A planting device comprising a support, soil penetrating means, soil tamping means and a movable connection between both such means and said support permitting movement thereof towards and from the soil for successive action thereon, said penetrating and tamping means being parts of the same member, said member being rotatable for such successive action.

3. A planting device comprising a support, soil penetrating means movably mounted thereon, and a plant supporting member movably connected with said support movable to and from position adjacent to holes in the soil produced by said penetrating means.

4. A device as in claim 1 in which the penetrating means and tamping means comprise a row of spaced-apart members.

5. A device as in claim 2 in which the soil penetrating and soil tamping means comprise a row of spaced-apart members and having means for inverting such members for successive action.

6. A device as in claim 3 in which the penetrating means comprise a row of spaced-apart members and the plant supporting member is a bar parallel with such row.

7. A device as in claim 3 having means for synchronizing movement of penetrating means and plant supporting member.

8. A device as in claim 1 having a soil support which is vertically adjustable.

9. A planting device comprising a support, soil penetrating means movably mounted on the support for movement to and from the soil surface, said support being bodily shiftable over the soil surface to place the soil penetrating means in different positions relative to such surface, a soil holder, and means guidably mounting said support on said holder.

10. A planting device comprising a pair of vertical side frames spaced apart horizontally, a carrier for a row of soil-engaging members and guide means between said frames and said carrier to control movement thereof with reference to the soil surface.

11. A device as in claim 10 in which the guide means include two portions that converge towards each other towards the soil surface.

12. A device as in claim 10 in which the guide means include two portions that converge towards each other towards the soil surface, the carrier being invertible by the guide means.

13. A planting device comprising soil penetrating means, soil tamping means, and means directing the soil penetrating means and the soil tamping means in converging paths to the soil surface and a support for said soil penetrating means, said soil tamping means and said directing means.

14. A device as in claim 1 in which the soil penetrating means is movable vertically and yielding means tending to move the same upwardly, connected therewith.

15. A planting device comprising soil penetrating means and soil tamping means, both of said means being parts of the same member, there being a plurality of members in a row and means to invert said members that successively present the soil penetrating means and the soil tamping means to the soil.

16. A planting device comprising soil penetrating means and soil tamping means, both of said means being parts of the same member, there being a plurality of members in a row and means to invert said members that successively present the soil penetrating means and the soil tamping means to the soil, comprising a hand-gripping handle at each end of the row.

17. A planting device comprising soil penetrating means and soil tamping means and means directing said penetrating means and said tamping means in paths that converge towards the soil surface said penetrating and soil tamping means being parts of a common member that is reversibly supported to interchange the soil-engaging positions thereof.

18. A planting device comprising soil supporting means, soil penetrating means and soil tamping means, means for supporting both such means above the soil supporting means, said soil penetrating means and said soil tamping means acting successively on the soil and said soil supporting means and said soil penetrating means and soil tamping means being relatively movable vertically.

CARL E. WILLIAMS.